June 14, 1966 C. F. PULVARI 3,256,481
MEANS FOR SENSING ELECTROSTATIC FIELDS
Filed March 21, 1960 3 Sheets-Sheet 2

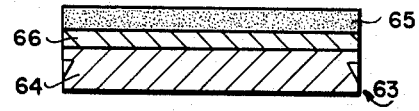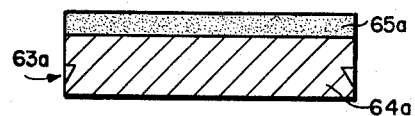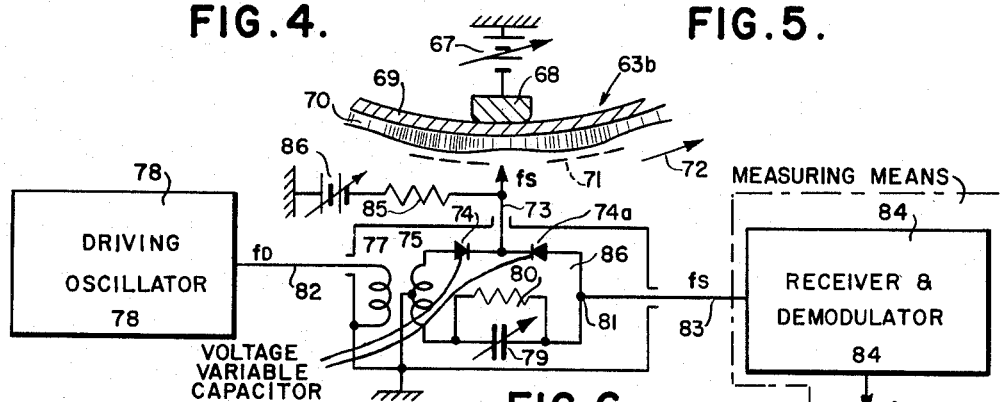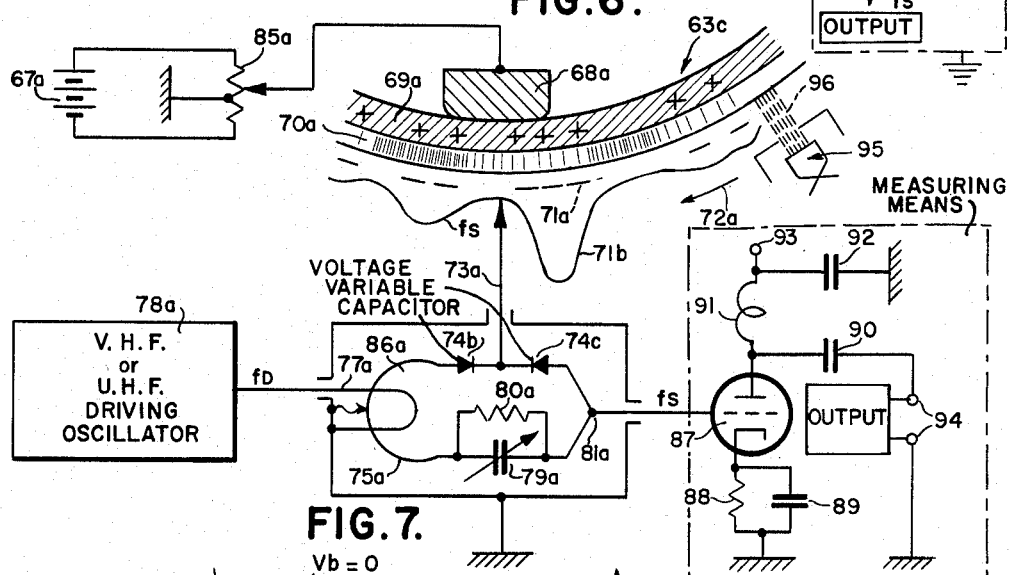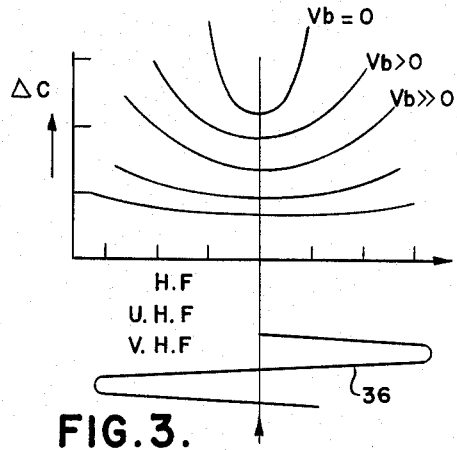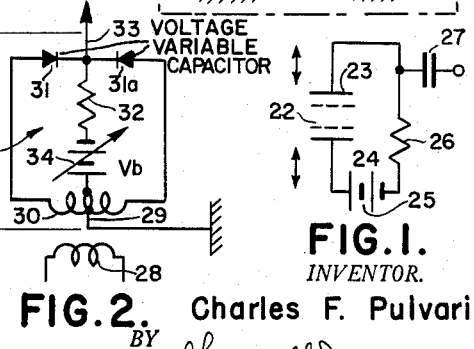

INVENTOR
Charles F. Pulvari
BY George K. Spencer
ATTORNEY

INVENTOR
Charles F. Pulvari
BY George K Spencer
ATTORNEY

United States Patent Office 3,256,481
Patented June 14, 1966

3,256,481
MEANS FOR SENSING ELECTROSTATIC FIELDS
Charles F. Pulvari, 2014 Taylor St. NE., Washington, D.C.
Filed Mar. 21, 1960, Ser. No. 16,305
14 Claims. (Cl. 324—32)

The present invention relates to a novel means for sensing electrostatic fields, more particularly, surface potentials caused by surface charges, without contacting or electroding the surface.

The present invention relates further to the measurement or detection of dielectric variations in a polarization pattern or capacitance variation of an electrostatic tape, such as a ferroelectric or thermoplastic video tape, as well as to the detection of fast electrostatic spikes or very short time fields caused by radiation, or particles originating from nuclear disintegration.

Previous methods for measuring potentials or minute capacity variations were based essentially on the mechanically vibrating condenser electrode method. Such devices are also called vibrating electrode electrometers. The heretofore known method can be explained by reference to FIGURE 1. When a condenser 22 with mechanically vibrating electrodes 23 and 24 is charged, for example, due to the influence of a field caused by a battery 25 or connected to another capacitor which contains a constant charge, an A.C. signal is developed in the circuit with the frequency of the vibrating electrodes. This A.C. signal appearing on the load resistor 26 can be conveniently picked up through a capacitor 27 and amplified. From this A.C. signal the capacity as well as the potential of said fixed capacitor 22 can be determined. Such mechanically vibrating electrode capacitors have been used for sensing surface charges from electrostatic tapes for detecting the dielectric variations of a polarization pattern of a ferroelectric tape described in U.S. Patent No. 2,698,928. This patent describes a vibrating electrode sensing method using ultrasonic drive for the electrode for detecting a ferroelectric tape. The frequency response of this device is limited by the highest applicable ultrasonic frequency as well as by the small amplitude of an ultrasonic drive. The capacity variation of such an ultrasonically driven vibrating or oscillating electrode condenser arrangement is quite small and as the driving frequency increases the signal developed on the oscillating capacitance device becomes comparable with the noise of the system. Another limitation of the ultrasonically driven oscillating capacitance type sensing device is that high ultrasonic frequencies develop heat.

The present invention eliminates these limitations and instead of the mechanically driven condenser electrodes employs a novel electrically driven oscillating capacitor or capacitors for sensing charges or small capacity variations. By eliminating the use of mechanical vibrations the sensing probe according to the present invention not only extends the frequency limits and thereby the usefulness of this novel measuring or sensing device, but since electrically driven variable capacitors allow capacitances to be vibrated in the V.H.F., U.H.F., or in the microwave region, the sensitivity for detecting very small capacitance variations or surface charges becomes high. As an example, a field of 0.1 volt/cm. or less gives very good signals, and voltage spikes with a rise time of about $5 \times 10^{-8}$ seconds can be well detected.

In sensing or detecting potentials in general, more particularly, surface potentials or minute dielectric variations in a polarization pattern, i.e. capacitance variation of an electrostatic information carrier, such as a ferroelectric or thermoplastic tape, this invention makes use of an electrically driven condenser or condensers the capacitance of which vibrates at a rate corresponding to the electrical drive. When a junction of a diode is operated in the reverse direction from that of easy current flow, it represents a capacitor the capacitance of which will depend on the operating point of the reverse characteristic. A voltage applied in the reverse direction causes a region of nearly zero charge carrier density, generally known as the depletion layer, which becomes thicker with increasing voltage. As a result, the two conducting areas of the diode are separated by a dielectric whose thickness increases or decreases depending on the applied voltage. This type of voltage dependent capacitor makes it possible to provide a vibrating capacitance the capacitance variation of which depends on the applied driving voltage and frequency as well as on the reverse bias voltage. Furthermore, elimination of the mechanically vibrating electrodes is made possible.

According to this invention the charge or charge distribution on a surface to be measured or sensed produces a control potential on the vibrating capacitor according to the potential to be sensed or the charge distribution of the surface. In case of an electrostatic tape, the portion of the tape with its electrode is included in a circuit comprising at least one electrically driven vibrating capacitor the vibrating capacitance of which is placed near the surface of the electrostatic tape by means of a knife-like electrode or with the aid of an electron beam which can scan the surface of the tape. If such voltage dependent capacitor or capacitors are included in a circuit of an oscillator, then the frequency of this electrical oscillator will vibrate the capacitance of the capacitor or capacitors. If the knife-like means or an electron beam connects the vibrating capacitor with the surface potential or electrostatic field of the electrostatic tape such as, for example, a thermoplastic or ferroelectric tape, an A.C. signal corresponding to the vibrating capacitor is generated, which signal can be further amplified.

In a further improved modification of this invention, the voltage dependent nonlinear capacitor or capacitors and the winding or windings coupled to an electrical oscillator for vibrating the capacitance of the capacitor or capacitors are center-tapped so as to form, together with some additional controllable impedances, a bridge circuit. The arms of this four gap bridge can be built in various ways. For the sake of explanation the following example is given. The center-tapped driving coil may form two arms of the bridge with the center-tap being grounded. Both sides of this center-tapped driving coil are adjustable or variable. The other two arms of the bridge may consist of combined resistance and capacitance components, for example, in one arm of the bridge there may be two back-to-back variable capacitance diodes, while in the remaining bridge arm the balancing and controllable or adjustable capacitance is placed. The latter adjustable capacitance may have some adjustable, rather high resistance. Due to the variable inductance of both arms of the center-tapped driving coil and the variable or adjustable capacitance and resistance, the bridge can be balanced.

This novel electrically vibrating capacitor electrometer can also be used to detect fast electrostatic spikes or very short time fields. Such fields are caused by charged or uncharged particles originating for example from nuclear disintegration or by any type of radiation in a counter. In this case, the center point of the two back-to-back diodes is connected to an appropriate counter tube which could be either gas filled, vacuum, or a solid state junction device of any type, responsive to such radiations. The voltage pulses appearing between the electrodes or terminals of the counter will produce signals in the electrometer circuit according to the principles already described and can be further amplified. Due to the fact that this electrically vibrated electrometer has a very fast response, its counting speed compares favorably with scintillation counters and has a number of important advantages over heretofore known counters.

The present invention also allows the sensing of any type of potentials, charges, electrostatic fields or surface charge distributions regardless of how they are produced, for example, by any method of electrostatography such as electrostatic electrophotography or electrostatic electrography or by placing charges on a thermoplastic, electrostatic or magnetic tape so as to obtain a charge pattern on the surface of the tape corresponding to the capacitance, dielectric or magnetization pattern of the tape, or by charged particles such as, for example, caused by nuclear disintegration.

It is, therefore, a general object of the present invention to provide a means of sensing surface charge distributions or electrostatic fields of any kind, for example, a surface charge distribution or pattern appearing on the target of a TV picture pick-up tube representing the electrical image of a picture, or any other kind of very fast varying electrostatic fields.

It is a further and important object of the present invention to reproduce the intelligence stored in form of a ferroelectric polarization pattern by depositing a uniform surface charge on the initially uncharged ferroelectric carrier whereby those portions of said polarization pattern which are stronger or weaker polarized or are in a random state will represent areas with different dielectric constants and therefore change the potential distribution of said deposited surface charges accordingly. As a result, the initially uniform surface charge potential develops into a charge pattern with varying potential the variation of which corresponds to the polarization pattern recorded in the tape. This process will be referred to briefly as "developed charge pattern" or "charge pattern development" analogous to the developing process used in the art of photography. The thus produced surface charge pattern is then detected by the electrically driven vibrating capacitor probe placed near the surface of the ferroelectric carrier. In order to avoid a change in the recorded and stored polarization pattern after reproduction said charge pattern may be removed or neutralized.

Still another object of this invention is to reproduce the intelligence stored in form of a ferroelectric polarization pattern by depositing a surface charge on an initially uncharged ferroelectric carrier in order to develop a charge pattern corresponding to the recorded polarization pattern as described before using however a uniform surface charge of a lower potential than used during recording in order to avoid undesired changes in the recorded and stored polarization pattern.

A further object of this invention is to reproduce the intelligence stored in form of a thermoplastic recording by setting the conductive base of the thermoplastic intelligence carrier to a desired level of potential by means of a voltage source. As the tape moves, the potential fluctuates on its surface corresponding to the recorded thermoplastic pattern. The thus produced potential fluctuation is then detected by the electrically driven vibrating capacitor probe placed near the surface of the thermoplastic information carrier.

It is another object of this invention to develop for reproducing purposes a charge pattern corresponding to a recorded magnetization pattern by depositing a surface charge of uniform potential on an initially uncharged magnetic carrier as described above, and to apply a playback head of the electrically driven vibrating condenser type, which may be used in connection with a knife or needle-like electrode, or a playback head supplying charged particles such as ionic or cathode ray means, which produce a beam of charged particles and can scan the surface on which, for reproducing purposes, a charge pattern is developed and produces a control potential on the electrically driven vibrating capacitor.

Other objects of the present invention include multiple track recording and reproducing as well as the series and parallel operation of such recorded tracks when reproduced.

Yet another object of this invention is to sense or detect high speed or very short time electrostatic fields caused by any type of particles or radiation of atomic or nuclear origin.

In general, the electrically driven vibrating capacitor electrometer may find use whenever electrostatic field or potential variations are to be detected and a wide band width is required.

It is understood that auxiliary circuits for stabilizing the frequency, amplitude, voltage, and automatic control of bias, or any other type of feed back circuits as they are known at present in the art of electronics, when used in connection with this novel electrically driven vibrating capacitor electrometer are also objects of this invention.

Other objects of the invention are electric and auxiliary devices to be associated with the new recording and reproducing apparatus including ionic or cathode ray scanning means for successively influencing the ferroelectric intelligence carrier to record information therein and to detect the electric conditions in the same sequence during the reproducing, and means to randomize or orient the storage medium by applying a high frequency or D.C. voltage across the intelligence carrier prior to the recording.

Other and further objects of the present invention will be more fully understood by reference to the following description and accompanying drawings, illustrating preferred embodiments thereof, wherein:

FIGURE 1, as aforesaid, shows schematically the mechanically vibrated electrode electrometer.

FIGURE 2 shows a basic circuit of the electrically driven vibrating capacitor according to the present invention.

FIGURE 3 presents the capacity variation of the electrically driven vibrating capacitor as a function of the electrical drive.

FIGURE 4 is a diagrammatic sectional view of a portion of a ferroelectric carrier used for recording and reproducing purposes.

FIGURE 5 is a diagrammatic sectional view of a portion of a ferromagnetic carrier.

FIGURE 6 shows the electrically vibrating capacitor electrometer in an application as a reproducing apparatus of electrostatic recordings.

FIGURE 7 is a schematic representation of a modified embodiment of the invention for reproducing purposes including the electrically vibrating capacitor means and the associated electrical devices.

Figure 10:
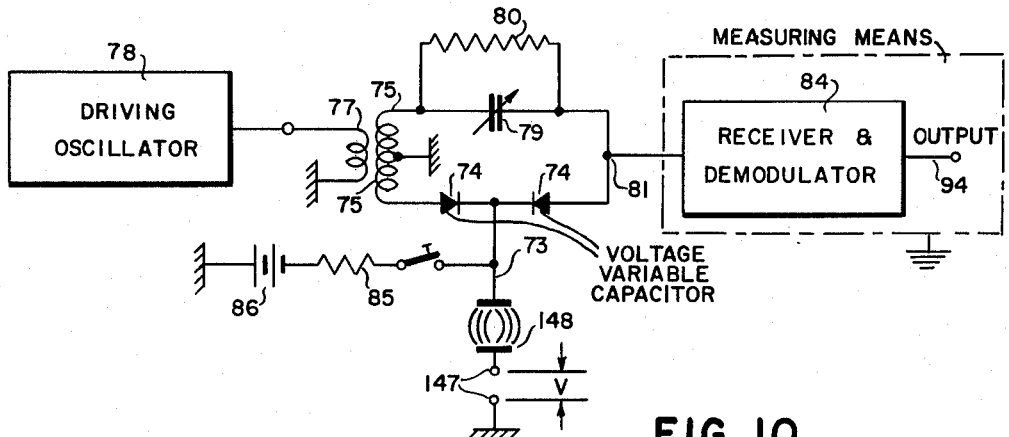

FIGURE 10 presents a general purpose electrostatic field sensing device utilizing electrically vibrating capacitor means.

Figure 11:
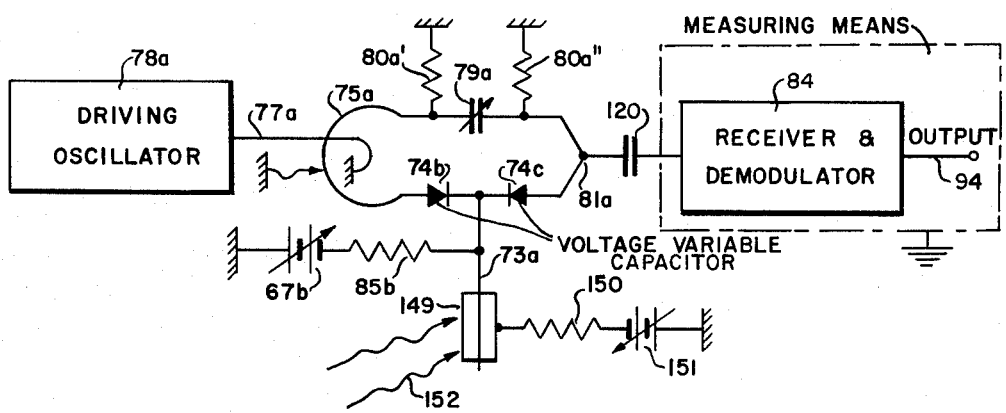

FIGURE 11 is a schematic presentation of a particle or radiation detector utilizing electrically vibrating capacitor means.

Figure 12:
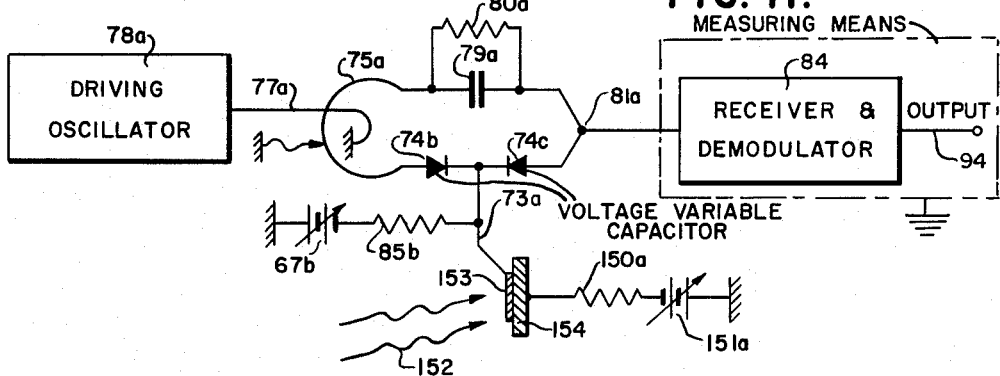

FIGURE 12 is a particle or radiation detector utilizing electrically vibrating capacitor means and a p-n junction as a sensing element.

FIGURE 2 shows a basic circuit which explains the operation of the electrically vibrated capacitor according to the present invention. This circuit serves only for explanation and measuring purposes and makes possible the determination of the capacitance variation $\Delta C$ as a function of an applied frequency which is in H.F., U.H.F., or V.H.F. range. The bridge circuit 35 comprises a center-tapped driving coil 30 which is connected to ground by way of lead 29. This driving coil 30 is the secondary of a high frequency transformer, whose primary coil 28 makes it possible to feed a high frequency to the bridge. The two ends of coil 30 are connected to two variable capacitance diodes of 31 and 31a each constituting a voltage-dependent depletion layer capacitor, as referred to above which are back-to-back connected to lead 33 and resistor 32. Various bias voltages $V_b$ can be applied in the reverse direction to the two back-to-back connected variable capacitance diodes 31 and 31a by the variable bias voltage source 34 which on one side is connected to resistance 32 and on the other side to ground through lead 29. Due to the nonlinear characteristics of the diodes 31 and 31a, a capacity variation $\Delta C$ will appear between lead 33 and ground.

FIGURE 3 shows the capacitance variation $\Delta C$ due to the oscillating electric drive voltage 36 applied across lead 33 and ground as shown in FIGURE 2. The various solid lines represent the points of instantaneous capacitances corresponding to the various A.C. amplitudes of the electrical drive voltage 36. Each solid line in FIGURE 3 represents a variation of $\Delta C$ for a given bias voltage. The largest $\Delta C$ is obtained with $V_b=0$. It is apparent that with increasing bias voltage the capacitance variation $\Delta C$ decreases. It is noted that both the negative as well as the positive swing of the electrical drive voltage 36 produces an increase of the capacitance. As a result, the frequency of capacitance fluctuation $\Delta C$ is twice that of the frequency of the drive voltage.

Figure 8:
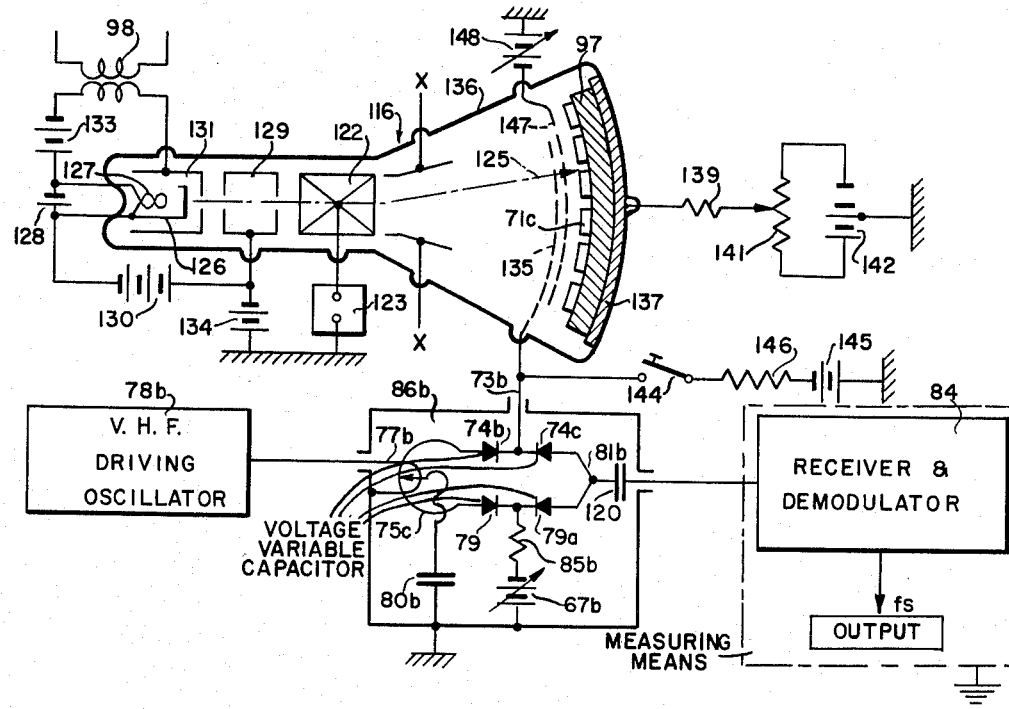
FIGURE 8 is a schematic representation of an electrically vibrating capacitor video pick-up tube.

If the center point of the two back-to-back diodes is brought into an electrostatic field by means of an electrode symbolized by an arrow at the end of lead 33 in FIGURE 2, or by means of an electronic beam as shown in FIGURE 8, the vibrating capacity will develop an A.C. signal in the circuit in which the diodes are included, corresponding to the vibrations of the capacitance. Although the capacitance variation of the sensing electrode varies at a rate equal to twice the driving frequency, the A.C. signal generated due to the field in the circuit will still have the frequency of the driving oscillator because the charges picked up in either limit of the swing of the electrical drive voltage 36 will pump the signal alternately in the circuit, since the function of the two diodes reverses in every half cycle.

If one of the diodes is replaced by a linear capacitor then only one half of the operating characteristics is utilized. It is understood that the variable capacitance diodes may also be driven either by a simple non-resonating high frequency coil, or a high frequency coil in resonance, with or without the use of a bridge circuit. The use of a bridge circuit, however, makes it possible to utilize a larger amplification of the picked up signal before it is demodulated.

FIGURES 4 and 5 show two embodiments of information carriers having a layer with ferroelectric, i.e., ferromagnetic properties. A base on which the active storage layer may be deposited is common to all types of such information carriers. This base may be a continuous band, film or foil, in other embodiments; it may also be a disc or drum. This base may be made out of acetate film, plastic, glass, metal, or, in general, any material having a smooth surface onto which the active layer may be then deposited. The active information storage layer may be a complex structure composed of several different layers.

The ferroelectric crystalline layer is hereinafter referred to simply as the active information storage layer.

The active information storage layer may be continuous but may also be applied in a subdivided fashion of any type, for example, in strips or frames similar to the picture frames of a moving picture film.

FIGURE 4 shows a carrier 63 comprising a base 64. A highly conductive layer 66 serves as a signal plate for the active information storage layer 65 into or onto which the layer with ferroelectric properties is applied. The signal plate 66 may be continuous but may also be applied in a subdivided fashion of any type, for example, in strips or frames similar to the picture frames of a moving picture film.

FIGURE 5 shows another embodiment in the form of a carrier 63a comprising a base 64a on which the active information storage layer or coating 65a is applied. This layer may, for example, be a layer with thermoplastic or ferromagnetic properties.

FIGURE 6 shows an apparatus for reproducing electrostatic field distributions representing information using electrically vibrating capacitors. An information carrier of the ferroelectric and/or thermoplastic type indicated generally at 63b and having a conductive base layer 69 and an active information storage layer 70 with ferroelectric and/or thermoplastic properties moves in front of a knife-like sensing member 73 in the direction indicated by arrow 72. The carrier 63b which may be in the form of a tape slides or moves in any desired manner through the conductive gate 68, which can be set to any desired level of potential by means of a variable voltage source 67, thereby adjusting the surface potential of the tape to a predetermined operating level.

A surface potential shown at 71 is developed on the surface of the active electrostatic storage layer 70, and the electrode 73 placed near the electrostatic layer is connected to the center point of two back-to-back voltage variable semiconductor capacitors in the form of diodes 74 and 74a. These capacitor diodes 74 and 74a which may be formed on a single slab of semiconductor material and thus be a single physical entity, constitute one arm of a four-arm bridge circuit. The two halves of a driving coil 75 having a grounded center-tap form two further arms of the bridge, and the remaining bridge arm comprises a balancing and controllable or adjustable capacitance 79 which is in parallel with an adjustable high resistance 80. Both arms of the center-tapped driving coil 75 are variable inductances and with the aid of the variable or adjustable capacitance and resistance, the bridge can be balanced. In practice, the resistance 80 may be omitted, this omission having but a slight effect on the accuracy of the balance of the bridge.

If an oscillator 78 having a frequency $f_D$ excites the bridge circuit comprising the variable capacitance semiconductor capacitors 74, 74a, through a coupling coil 77 by way of lead 82, the sensing electrode 73, which together with the conductive layer 69, a portion of the electrostatic storage layer 70 and an air gap between the latter and the electrode 73 forms a capacitor, acts as a vibrating capacitor probe. The capacitance of the center point of capacitors 74 vibrates at twice the frequency of the driving oscillator 78 and as the surface potential varies with the movement of the tape, the potential of sensing probe 73 varies accordingly. The vibrating capacity at the center point of capacitors 74, 74a is alternately charged through the field acting on sensing probe 73 and an A.C. signal is generated in the bridge circuit according to the basic principles of a vibrating capacitor electrometer explained in connection with FIGURES 1, 2, and 3.

Although the capacitance variation of the sensing electrode varies at twice the driving frequency, the A.C. signal generated due to the field in the bridge circuit will still have the frequency of the driving oscillator because the charges picked up in either limit of the swing of the electrical drive will pump the signal alternately in the bridge circuit since the function of the two diodes reverses in every half cycle. It will be noted that if the bridge is balanced by proper adjustments of the bridge arms, the driving high frequency between the grounded center-tap of the driving coil and the zero point 81 of the bridge connected by a lead 83 to the receiver and demodulator 84 will become nearly zero.

If the bridge circuit is balanced the driving oscillator would cause the capacitance of the variable capacitors 74, 74a to vibrate with a minimum high frequency oscillation to enter into the receiver and demodulator 84. The better the bridge is balanced, the smaller will be the driving high frequency entering into the receiver and demodulator 84 and as a result a higher amplification can be utilized. The A.C. signal produced by the interaction of the vibrating capacity of diodes 74, 74a, electrode 73, and the field, due to the surface potential or charge on the information carrier, appears unbalanced between the bridge point 81 and ground of the otherwise balanced bridge, and enters the measuring means which are connected across a diagonal of the bridge circuit for measuring the signal which is due to the electrostatic field to which the above-mentioned capacitor—i.e., the capacitor that includes the probe 73—is exposed. FIGURE 6 shows this measuring means to comprise the receiver and demodulator 84 which produces an output signal $f_s$ corresponding to the signals stored in form of surface potential $f_s$ and applied to the output. The driving frequency is preferably so chosen that it corresponds to the resonance frequency of the bridge.

The two variable capacitor diodes 74, 74a can be biased in the reverse direction through a high resistance 85 and a battery 86 so as to provide different operating characteristics for the diodes, as shown in FIGURE 3.

The electrically driven vibrating capacitor electrometer differs from an ordinary modulating circuitry basically in that in ordinary modulating circuits the diodes tune the resonance circuit by shifting the operating point of the diodes according to the signal, and thereby cause a modulated high frequency. This tuning of the operating point requires considerable energy, and therefore the center point of the diodes is directly driven with the modulating signal. In contrast, the vibrating capacitor electrometer is field sensitive and the pick-up electrode does not have to be in any direct contact with the signal carrier. The operating point of the diodes in this case does not vary according to the signal; the diodes serve merely to produce a vibrating capacity which vibrating capacity will convert a D.C. field into an A.C. signal according to the principle of the vibrating electrode electrometer as explained in connection with FIGURE 1.

The circuit shown in FIGURE 6 may also operate without the use of a bridge circuit. In that case, the bridge arm consisting of variable capacitor 79 and resistance 80 would be omitted; however, the high frequency of the driving oscillator would enter into the receiver and demodulator 84 without compensation and as a result only a much smaller amplification of the field-induced A.C. signal becomes possible, and the device becomes less sensitive.

FIGURE 7 presents another modification of the apparatus for reproducing electrostatic charge distributions representing information using electrically vibrating capacitors. An information carrier of the ferroelectric type shown as a tape 63c having a conductive base layer 69a and an active information storage layer 70a with ferroelectric properties moves in front of the knife-like sensing electrode member 73a in the direction indicated by arrow 72a. The tape slides or moves in any desired manner through the conductive gate 68a which can be set to any desired level of potential by means of a variable voltage source 67a, and a variable potentiometer 85a, thereby adjusting the surface potential of the tape to a predetermined operating level. Assuming that a surface charge 71a is developed on the surface of the active ferroelectric storage layer 70a and the electrode 73a placed near the ferroelectric layer is connected to the center point of two variable capacitance semiconductor capacitors 74b, 74c which are included in a bridge circuit 86a, this electrode 73a serves as a probe, as explained in connection with FIGURE 6. This bridge also includes the two halves of a driving loop 75a having a grounded center-tap, a variable capacitor 79a and the resistor 80a, and has a zero point 81a.

If a signal oscillator 78a having a driving frequency $f_D$ excites the driving loop 75a through the coupling loop 77a, this would cause the two variable capacitance semiconductor capacitors 74b, 74c to oscillate in a manner similar to that described above in connection with FIGURE 6.

The circuit operates on the same principle as that of FIGURE 6 except that a U.H.F. or V.H.F. driving frequency is shown, and as a result the driving and coupling coils in bridge circuit 86a reduce to single loops. Obviously, microwaves may also be used for vibrating the capacitor diodes 74b and 74c.

The ferroelectric tape as well as the means for biasing conductive gate 68a on which the ferroelectric tape moves in front of the knife-like sensing member 73a are the same as described in FIGURE 6. The charge pattern 71a is represented in a different form. In FIGURE 7 plus and minus signs indicate the charge pattern and this pattern is shown in the form of a continuous curve 71b which corresponds to the polarization pattern in the ferroelectric tape 63c indicated by groups of lines in the ferroelectric layer 70a. Wherever the line density is high it is assumed that the dielectric constant is high. Wherever the line density is low or omitted the dielectric constant is low. Correspondingly, if an electron gun assembly 95 directs a uniform electron or ion beam 96 toward the surface of the ferroelectric tape 63c, the charged particles will give rise to a surface potential which will vary according to the variation of the dielectric constant in the ferroelectric tape corresponding to the recorded information.

This surface potential varies as the tape moves in a condenser consisting of the conductive gate 68a which is connected to ground on one side through potentiometer 85a, and of the knife-like electrode 73a which is connected to the electrically vibrating semiconductor capacitors 74b, 74c and through driving coil 75a to ground. It can be seen that between the two ground points of the above described condenser there is one portion of the condenser between knife 73a and conductive gate 68a in which the condenser potential varies as the surface potential varies corresponding to the moving ferroelectric tape. As a result, the potential on knife 73a varies and a corresponding A.C. signal will be developed in bridge circuit 86a according to the principle of the vibrating capacitor electrometer already described in connection with FIGURE 6. This A.C. signal is connected to the grid of amplifier tube 87. The cathode of amplifier tube 87 is biased through resistance 88 which is by-passed by capacitor 89 in the anode circuit a resonant circuit consisting of coil 91 and capacitors 90 and 92 serves as an impedance, an anode supply (not shown) being connected at 93. The amplified signal can be obtained across output terminals 94.

Another modification of an electrostatic recording or reproducing apparatus according to the invention is shown in FIGURE 8. A cathode ray tube 116 in a glass envelope 136 represents a cathode ray generating device as used for television receiving or reproducing. An electron beam 125 is generated by a cathode 126 in the tube 116 and focused on the surface of insulator 97 where a charge pattern is represented by the spots 71c. This charge pattern can be of the sort produced by a photographic lens when the spots 71c are made of a photoelectrically sensitive mosaic. In general, the spots indicated could represent any type of charge pattern such as video signals or digital information. The display of a charge pattern on the dielectric surface 97 by electron gun 125 can be accomplished by deflecting the electron beam through the deflection plates 122 energized by deflection generator 123 or deflected vertically by additional deflection plates connected to a second deflection generator (not shown). The electron beam 125 is accelerated and focused by an anode 129 which is placed at a positive potential with respect to the cathode 126 by means of a voltage source such as the battery 130. The cathode ray beam 125 is modulated by means of a modulating element 131 which is connected in circuit with a cathode 126 and the secondary of an input transformer 98. A voltage source such as the battery 133 in this circuit furnishes the proper bias for the modulating electrode 131. The emission of the emitter 126 is produced by filament 127 and the heater battery 128. The potentials of the front grids 135 and 147 are adjusted through battery 134 connected on one side to the accelerator anode 129 and ground, grid 147 being inserted between sensing grid 135 and the surface of dielectric 97 and properly biased through a variable battery 148 so as to set an initial surface potential level on the insulator surface 97 as required. Instead of battery 148 a flip-flop device (not shown) could be used to change the bias of grid 147.

The common electrode 137 can be adjusted to any potential by means of potentiometer 141 and battery 142.

The sensing grid 135 can, if desired, be biased through the bias battery 145 and resistance 146 when these elements are connected through switch 144 to lead 73b. The potential variation appearing on grid 135 is fed through lead 73b for signal detection purposes to an electrometer bridge circuit 86b similar to that described in connection with FIGURES 6 and 7, the only difference being that both capacitance bridge arms are made of variable capacitor diodes 74b, 74c, 79, 79a and the bridge balance can be obtained by applying a proper bias to the diodes 79, 79a through resistor 85b and battery 67b. Another modification in the bridge circuit is that the driving coil 75c is grounded through the capacity 80b and the zero point 81b of the bridge is coupled through another capacitor 120 to the receiver and demodulator 84. The coupling coil 77b is connected to oscillator 78b, as in the embodiment of FIGURE 7.

Figure 9:
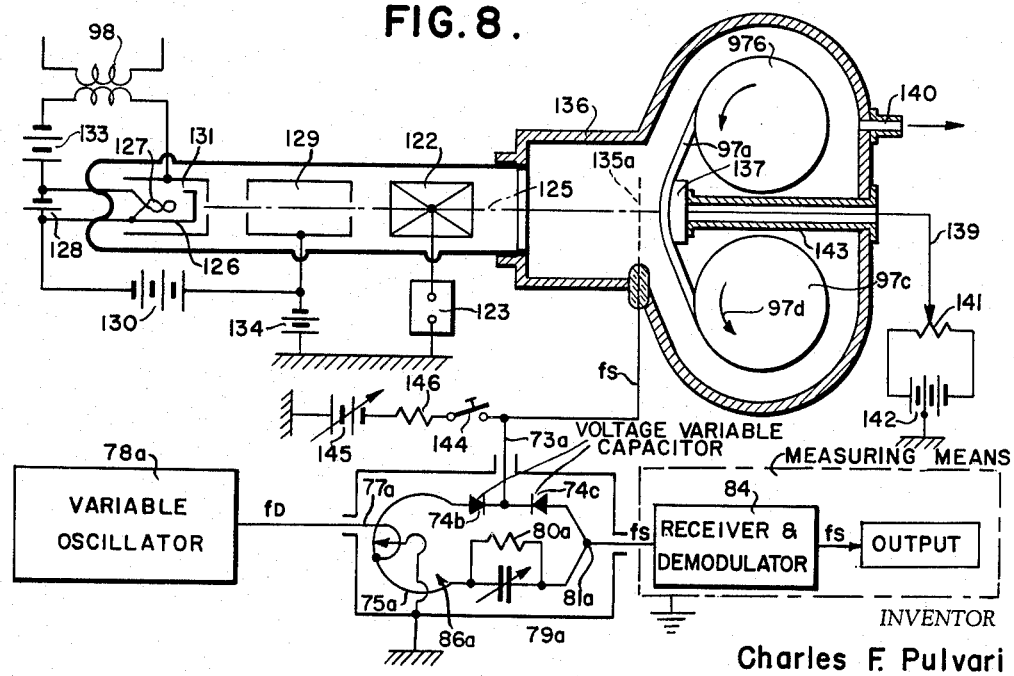
FIGURE 9 shows a diagrammatic view of the reproducing apparatus of the present invention including circuits.

A further development of the tape recording and reproducing apparatus according to the invention is shown in FIGURE 9. In this embodiment recording is carried out by depositing a charge pattern using electron beam 125 on a tape essentially in a manner similar to that described in U.S. Patent No. 2,698,928 in connection with FIGURE 4 thereof.

In this case, an electron beam 125 is used also for the reproducing step, which is produced in the cathode ray gun similar to that described in FIGURE 8. The polarization pattern corresponding to the information stored in tape 97a moves continuously or stepwise on the arcuate member 137 which is made of conducting material and the potential of which can be set through lead 139 which comes out through tubing 143 and connects to a potentiometer 141 and a bias battery 142 to ground. In front of this tape there is a collector grid 135a placed near the tape surface. The tape moves from a supply reel 97b to a take-up reel 97c in the direction of arrow 97d.

The polarization pattern is converted into a charge pattern due to the scanning electron beam 125 which develops a charge pattern on the surface of the tape.

The sensing circuit is similar to that of FIGURE 7 and the electrically vibrating condensers 74b, 74c connect through lead 73a to grid 135, thus sensing the surface potential of each surface element as the electron beam scans over the surface. Amplification of the thus detected surface potential is accomplished similarly as described in connection with FIGURES 6 and 7.

Enclosure 136 could be made of any material, such as a glass or metal, used as in case of electron tubes. The ferroelectric intelligence carrier can be of any form such as a band, film, or foil, or in other embodiments it may also be a disc or drum. The recording chamber formed by the enclosure 136 is evacuated by a vacuum pump (not shown) connected to outlet nipple 140.

The transport of the ferroelectric intelligence carrier can as stated above be continuous or step-wise. Instead of using one signal sensing grid 135 shown in FIGURE 9, additional grids may be inserted in order to eliminate surface charge and space charge accumulation, or to produce a charge image of the surface charge pattern on the grid which then is detected by the electron beam. In general, by following the basic principle described, any grid configuration as well as any number of grids could be used as known from the present state of art.

FIGURE 10 shows essentially the same electrically vibrating capacitor electrometer as described in principle in connection with FIGURES 1, 2, and 3 and in operation in connection with FIGURE 6 except this schematic drawing exemplifies a general use of this novel electrometer. Sensing electrode 73 is brought near to the electrode 148 which is brought on a higher potential with respect to ground by the application of a voltage V across the terminals 147. The applied voltage V may be D.C. or any type of A.C. The applied potential is detected in the same manner and according to the same principles already described. It is a distinct and outstanding feature of the electrometer according to the present invention that it detects a very wide band width; for example, when the vibrating capacitors are given a 100 megacycle capacitance vibration, then from D.C. potential up to 60 megacycle field vibrations are readily detected and the sensitivity of the device is such that from about 0.01 volt up to 10 volts can be readily detected throughout the whole band.

FIGURE 11 presents the application of the electrometer according to the present invention as a radiation or charge particle detector. The electrometer circuit is essentially the same as in FIGURE 7, with the addition of the biasing battery 67b and resistor 85b as well as the coupling capacitor 120 of FIGURE 8, and the replacement of the resistor 80a across capacitor 79a by the grounded resistors 80a' and 80a". Here the sensing electrode 73a connects to a counter tube 149 which can, for example, be gas filled, or be an evacuated counter tube.

73a and 149 constitute the electrodes of the counter which can be properly biased through resistance 150 and battery 151. When radiation or charged particles cause any reaction with the targets of the electrodes or with the gas between the targets, the potential spike appearing between electrodes 73a and 149 will be sensed through the electrometer.

FIGURE 12 is another modification of a counter type application as shown in FIGURE 11. The electrometer circuit is similar to the circuit discussed in connection with FIGURE 11. A semiconductor device shown as a p-n junction is used as a radiation or particle detector, the two electrodes of the junction device being 153 and 154. The junction can be properly biased through resistor 150a and battery 151a and when radiation or particles symbolized by the arrows 152 cause a voltage pulse through said semiconductor junction it will be detected through sensing lead 73a in the same manner as previously discussed.

If desired, the semiconductor device may consist of two junctions formed on a single semiconductor slab.

It will be understood that the above description of the present invention is susceptible to various modifications, changes and adaptations, and the same are intended to be comprehended within the meaning and range of equivalents of the appended claims. For example, any suitable means for vibrating the capacitor probe may be used. Thus, if the oscillator operates at microwave frequencies, the vibrating means may be an electrically excited wave guide or cavity.

I claim:

1. A sensing device comprising: means forming a first capacitor; vibrating means for electrically vibrating said first capacitor, said vibrating means comprising a four-arm bridge circuit one arm of which incorporates at least one voltage variable non-linear second capacitor, said first capacitor being connected to said one arm, two other arms of said bridge circuit incorporating, respectively, the two halves of a center-tapped coil, and the fourth arm of said bridge circuit incorporating a balancing impedance, said vibrating means further comprising an oscillator coupled to said coil; and measuring means connected across a diagonal of said bridge circuit for measuring a signal due to an electrostatic field to which said first capacitor is exposed, said first capacitor thus acting as a sensing probe.

2. A sensing device as defined in claim 1 wherein said one arm incorporates two back-to-back voltage variable nonlinear capacitors and wherein said first capacitor is connected to the junction of said second capacitors.

3. A sensing device as defined in claim 2 wherein two back-to-back voltage variable nonlinear second capacitors are a single physical entity.

4. A sensing device as defined in claim 2 wherein said two back-to-back voltage variable nonlinear second capacitors are formed on a single slab of semiconductor material.

5. A sensing device as defined in claim 1 wherein said voltage variable nonlinear second capacitors are diodes.

6. A sensing device as defined in claim 1 wherein said balancing impedance comprises an RC circuit.

7. A sensing device as defined in claim 1 wherein the center tap of said coil is grounded.

8. A sensing device as defined in claim 1 wherein the center tap of said coil is grounded by way of an additional capacitor.

9. A sensing device as defined in claim 1, wherein said oscillator operates at high frequency and wherein said coil is a single turn coil.

10. A sensing device as defined in claim 1 wherein said oscillator operates at microwave frequencies and wherein said vibrating means is an electrically excited wave guide or cavity.

11. A sensing device as defined in claim 1, further comprising biasing means connected to said first capacitor.

12. A sensing device as defined in claim 1 wherein said balancing impedance comprises two additional back-to-back voltage variable nonlinear capacitors.

13. A sensing device as defined in claim 12 further comprising biasing means connected to said additional voltage variable nonlinear capacitors.

14. A sensing device as defined in claim 1 wherein said measuring means are connected to said bridge circuit by way of an additional capacitor.

References Cited by the Examiner

UNITED STATES PATENTS

| | | | |
|---|---|---|---|
| 2,532,010 | 11/1950 | Courvoisier | 324—32 X |
| 2,555,959 | 6/1951 | Curtis | 332—30 |
| 2,654,067 | 9/1953 | Bruce | 324—61 |
| 2,750,454 | 6/1956 | Melville | 317—246 X |
| 2,773,137 | 12/1956 | Hollmann | 317—249 X |
| 2,874,305 | 2/1959 | Wilson et al. | 250—83.6 |
| 2,876,436 | 3/1959 | Anderson | 340—173 |
| 2,884,607 | 4/1959 | Uhlir | 317—249 X |
| 2,884,618 | 4/1959 | Epstein | 340—173 |
| 2,888,648 | 5/1959 | Herring | 332—30 |
| 2,916,681 | 12/1959 | Brady et al. | 317—262 |
| 2,944,200 | 7/1960 | Solomon et al. | 317—262 |
| 2,954,474 | 9/1960 | Lawrance | 250—83.6 |
| 2,989,650 | 6/1961 | Doucette et al. | 317—242 X |
| 2,993,165 | 7/1961 | Jauch | 324—32 |
| 3,020,493 | 2/1962 | Carroll | 332—30 X |
| 3,023,378 | 2/1962 | Fuller | 307—88.5 |
| 3,113,287 | 12/1963 | Renner | 340—10 X |

OTHER REFERENCES

Hammerslag, J.: "Circuit Design Using Silicon Capacitors," Electronics, volume 32, September 18, 1959, pages 48–50.

WALTER L. CARLSON, *Primary Examiner.*

LLOYD McCOLLUM, FREDERICK M. STRADER,
*Examiners.*

C. F. ROBERTS, G. R. STRECKER,
*Assistant Examiners.*